April 4, 1939.　　　I. E. McCABE　　　2,153,197

CONTROL SYSTEM FOR STOKERS

Filed Sept. 3, 1935　　　3 Sheets-Sheet 1

INVENTOR.
IRA E McCABE

BY  *Longdon Moon*

ATTORNEY.

April 4, 1939.  I. E. McCABE  2,153,197

CONTROL SYSTEM FOR STOKERS

Filed Sept. 3, 1935  3 Sheets-Sheet 3

INVENTOR.
IRA E McCABE
BY *Langdon Moore*
ATTORNEY.

Patented Apr. 4, 1939

2,153,197

UNITED STATES PATENT OFFICE 2,153,197

CONTROL SYSTEM FOR STOKERS

Ira E. McCabe, Chicago, Ill.

Application September 3, 1935, Serial No. 38,879

5 Claims. (Cl. 236—46)

This invention relates to a control system for coal stokers and more particularly to the means for and method of maintaining a fire during periods when house heating is not in demand. This invention is a modification of the system and controls therefor for the automatic control of stoker heating systems disclosed in this applicant's prior pending application, Serial No. 651,750, filed January 14, 1933, Patent No. 2,131,783, August 4, 1938.

A method for supplying sufficient fuel to prevent the fire from going out or maintaining a hold fire, as it is called, in an automatic system of control has been a major problem in working out all such systems. Two of the most common of these methods consist in causing the stoker to operate at predetermined intervals for predetermined periods during "off" thermostat periods, or in causing such stoker operations to occur upon a drop in temperature to a predetermined degree and continue until a predetermined increase has taken place. The device most commonly used for actuating the stoker motor to operate at the predetermined temperature has been a commercial combustion responsive mechanism employing a bi-metallic or thermal element subjected to the flue gas and in response to the temperature changes thereof to operate to open and close a switch in the stoker circuit as desired.

These systems, while providing hold fire means, necessarily, must be adjusted at the time of installation for periods which will be satisfactory during the entire heating season. These adjustments must be made in accordance with, or based upon, the kind of fuel to be used and the length of the periods of stoker operation during the heating season so that the control will always operate the hold fire means, as for instance, during the mild mid-day periods encountered in the spring and fall as well as during normal operations throughout a cold winter.

When adjustments are made to meet all such conditions, there exists the possibility of waste by feeding more fuel than necessary resulting in overheating and, on the other hand, attempted economy usually causes the system to fail. Then again, after adjustment, should a change be made in the kind of fuel used, or a change occur in the operating characteristics of the combustion responsive mechanism as usually employed in such systems, the proper operation of the system is affected.

In regard to the latter mechanism, such a change is quite common for after the bi-metallic or thermal element is subjected to the high temperature for long periods encountered during the winter, a set takes place in the element sufficient to affect its operation in accordance with its original calibration.

This invention proposes to maintain a fire during "off" periods of the thermostat, not by figuratively predetermining the number of operations, the amount of fuel to be supplied, or the temperature differentials for controlling operation without overheating or allowing the fire to go out, but by feeding fuel during such periods and either delaying or terminating the operations when the fire itself is satisfied. In other words, this invention employs an interval timer continuously closing and opening a switch at predetermined periods, for example, closing twice an hour, and a combustion responsive mechanism coacting therewith to complete the motor circuit when a hold fire operation is required independently of the room thermostat and to interrupt the circuit when the hold fire operation has satisfied the fire to maintain combustion.

When a small change in temperature takes place, regardless at what degree of temperature the change is initiated, whether caused by the feeding of fuel in response to the thermostat or interval timer, the combustion responsive mechanism will operate to interrupt the hold fire circuit. Should the interval timer switch be closed at the time the thermostat opens its circuit, the temperatures produced during the operating period will have caused the combustion responsive mechanism to operate to delay the immediate hold fire call of the interval timer until a drop in temperature occurs. Should high temperatures be produced by prolonged periods of thermostat operation it is possible to skip one or several hold fire operations. This would result should the bi-metal operating the combustion mechanism possess the characteristics, common to certain forms of commercially available bimetal, in which movement per degree temperature change decreases as the temperature increases. Whereas, at low temperatures a fifty degree drop may operate the combustion mechanism the same degree of change at high temperatures would not be sufficient to cause the mechanism to operate so that during the period required to reduce the temperature to operate the combustion mechanism the timer may pass through one or more of its closing intervals. During a period of operation as initiated by the interval timer switch, after the combustion mechanism had operated due to a drop in temperature, the increase in temperature resulting from the injection of fresh fuel, will cause the combustion responsive mechanism to interrupt the operation of the motor.

The combustion responsive mechanism, as employed in this system, responds and operates upon an increase or decrease in temperature. The points of operation are not predetermined. During operations of the thermostat, the combustion responsive mechanism functions at high temperature, while during long periods in which operations are controlled by the hold fire means, its operation will occur at lower temperatures. Therefore, it is readily seen that the setting of the bi-metal or thermal element upon subjecting it to high temperatures as will occur when operating at predetermined high and low temperatures set to a calibrated device, as required in the known types of systems previously referred to, does not affect its functions as used in connection with this invention.

With these and other objects in view, reference is made to the accompanying sheets of drawings, which illustrate an embodiment of this invention, with the understanding that detailed changes may be made without departing from the scope thereof.

Figure 1:
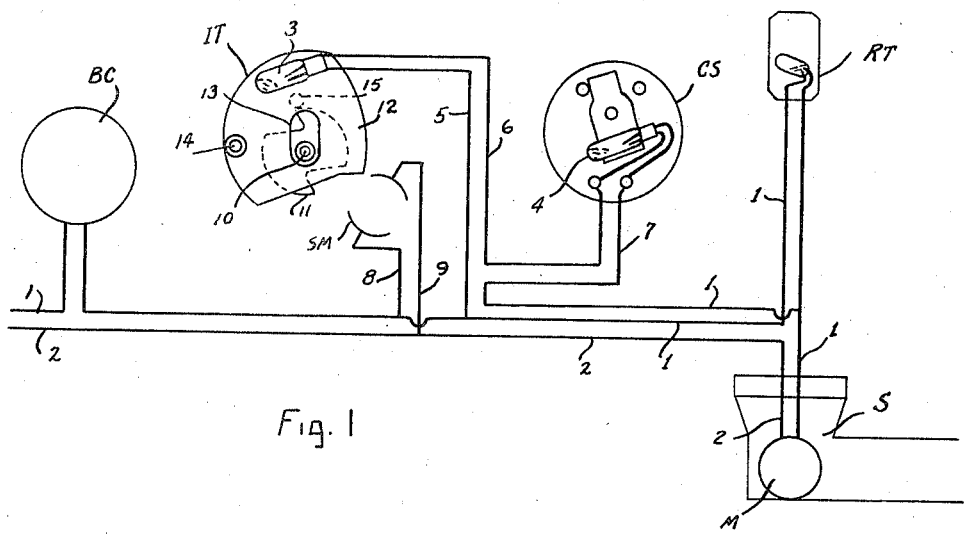
Figure 1 is a schematic wiring diagram of one form of this invention.

In carrying out this invention, as shown in Figure 1, the commercial source of electricity is connected by the wire 1 to the motor M for operating the stoker S and by the wire 2 to the commercial return. The stoker S may be of any desired form of electrically operated and controlled coal stoking mechanism. A commercial room thermostat RT is connected in series with the motor M through wire 1 and, if desired, a commercial boiler control BC may be similarly connected in the motor circuit. The room thermostat is located at a convenient place within the space to be heated and starts and stops the feeding of fuel to the heater to which the stoker is installed in accordance with predetermined temperatures for which the thermostat may be set to operate.

When the room thermostat RT calls for heat, the circuit of the motor M is closed and the stoker mechanism will begin to feed fuel and continue to do so until the demand for heat is satisfied, which causes the room thermostat to open the motor circuit. In order to hold the fire within the heater and prevent cessation of combustion, in accordance with this invention, an interval timer IT is combined with a combustion responsive mechanism CS.

The interval timer IT includes a switch 3, such as the mercury tube switch shown, which is opened successively and closed for definite intervals and at definite times, as hereinafter described. The combustion responsive switch CS, of any commercial form, is shown as including a mercury tube switch 4 so mounted as to be actuated to open upon establishment of combustion. The switches 3 and 4 are connected by the wires 5, 6 and 7 in series with each other and in series with the commercial line 1 on opposite sides of the room thermostat RT. When the call for heat has been satisfied and the room thermostat opens the motor circuit and the combustion responsive mechanism cools, it closes the switch 4, then each time the interval timer IT closes the switch 3, the circuit to the motor M will be closed through wires 1, 5, 6, 7, and 1, through the motor M to the return wire 2, as long as the switch 4 remains closed, and when the interval timer IT opens switch 3, the motor circuit will be again opened.

Figure 3:
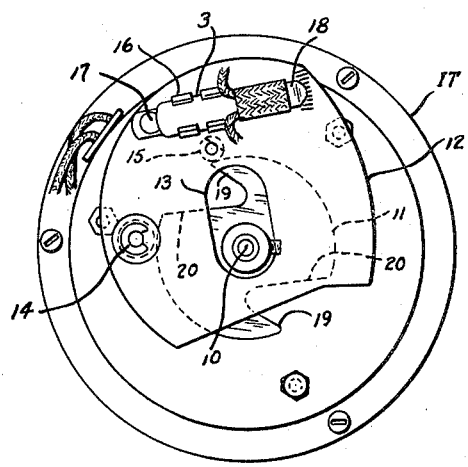
Figure 3 is an enlarged detail view in front elevation of the interval timer shown in Figure 1.
Figure 4:
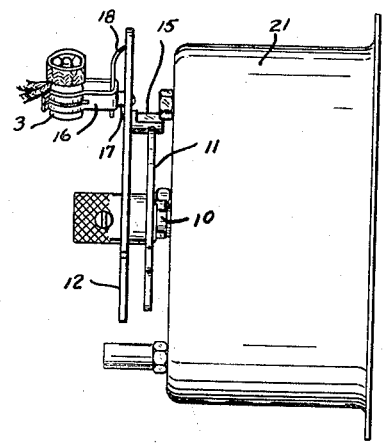
Figure 4 is a view in side elevation of Figure 3.

The interval timer IT includes a commercial self-starting synchronous electric motor SM connected across the line 1—2, or in multiple therewith, by wires 8 and 9. The motor SM is adapted to rotate continuously a shaft 10 upon which is mounted an oppositely notched disc 11. The switch 3 is mounted upon a carrier plate 12, preferably provided with a perforation 13, to allow the shaft 10 to pass therethrough, and is pivoted near one edge upon a post 14 at one side of the axis of the shaft 10 and preferably slightly thereabove. The carrier plate is provided with a stud 15 extending from one side thereof and adapted to ride over the periphery of the notched disc 11. The plate 12 is so proportioned and so pivoted that when the stud 15 travels over the arcuate portions of the circumference of the disc 11, the plate will be in its uppermost position with the perforation adjacent the under side of the shaft 10. The switch 3 is carried in a clip 16 having a stud 17 for adjustably mounting upon the plate 12 and is so adjusted that when the plate 12 is in its uppermost position, the switch will be tilted to its open position, as shown in Figures 1 and 3. The clip 16 is provided with an indicator pointer 18 extending from one end thereof adapted to pass over a scale upon the plate 12 to indicate the degree of adjustment of the switch 3.

The disc 11 is provided with a plurality of complementary notches, preferably two in number, and oppositely disposed, having the side 19 which first travels under the stud 15 so cut that when the stud is free to drop into the notch it will be engaged by the other side 20 thereof, which side is formed at an acute angle to the side 19, so that as the disc continues its rotation, the side 20 will gradually move the stud upwardly to be engaged by the succeeding arcuate portion of the circumference of the disc 11. When the stud 15 drops into the notch, the weight of the switch carrier plate 12 will cause it to rotate downwardly about its pivot 14 and in so doing will tilt the switch 3 into its closed position. As the stud 15 travels over the side 20 of the notch, the carrier plate 12 is rotated to return to its uppermost position to tilt the switch 3 to its open position. The synchronous motor SM is mounted, preferably, within a casing 21 through which the shaft 10 passes, with the disc 11 mounted exteriorly thereof, and upon which the pivot stud 14 is mounted, as shown in Figure 3.

Figure 5:
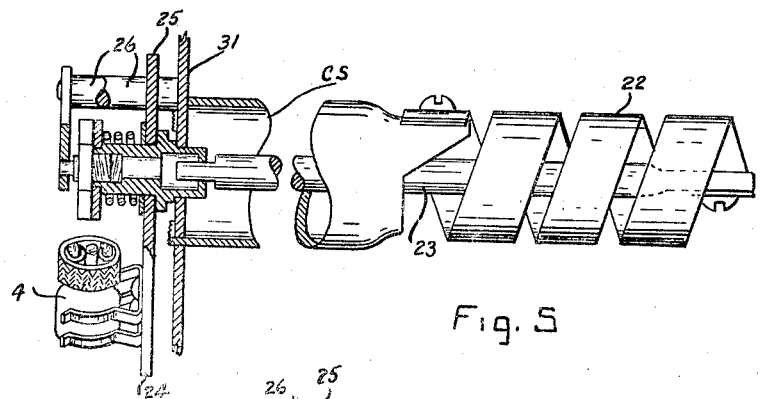
Figure 5 is a detailed view of the combustion responsive mechanism shown partly in side elevation with parts broken away and partly in section.
Figure 6:
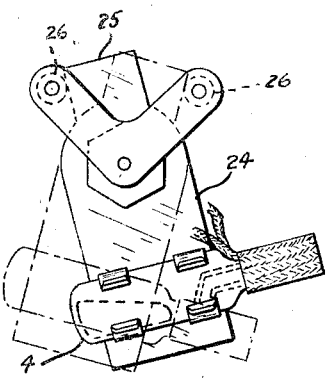
Figure 6 is a fragmentary detail view in front elevation of Figure 5, showing the switch actuator.

The combustion responsive switch mechanism is of commercial construction, having an override, and is responsive to any rise or drop in temperature and, as shown in Figure 5, includes an expansible and contractible thermal helix 22, placed in the path of the products of combustion from the fire, with the free end thereof secured to a rotatable operating shaft 23. The other end of the shaft mounts a switch actuator in the form of a plate 24 having a conventional slip connection with the operating shaft. As shown in Figure 6, a portion of the actuator is extended above the operating shaft to form a stop 25, adapted to limit the rotative movement of the actuator plate in opposite directions, by engagement with the stop-pins 26, and allow further rotation of the shaft in that direction. The portion of the actuator plate 24 below the operating shaft 23 mounts the switch 4, which is shown as a mercury tube switch, and which is so adjusted that when the helix 22 has responded to an increase in temperature from combustion, the actuator will be rotated to the limit of its travel in one direction and tilt the switch 4 to open position, and upon a decrease in combustion temperature, the helix 22 responds to rotate the actuator to the limit of its travel in the opposite direction to tilt the switch to its closed position.

Therefore, it is seen that when the room thermostat RT closes, the motor circuit is closed and the stoker will feed fuel until the room thermostat opens and opens the motor circuit. The combustion responsive switch mechanism CS responds to the increase in temperature from increased combustion to open the switch 4. The motor SM of the interval timer, being connected in multiple with the commercial line, will operate continuously and independently of the room thermostat or motor M. The notched disc 11, moreover, will continuously oscillate the carrier plate 12 to open and close the switch 3 alternately. The length of time the switch 3 remains open depends upon the speed of rotation of the shaft 10 and the length of the arcuate portions of the circumference of the disc, and the length of time the switch 3 remains closed depends upon the shape of the notch or angular relation of the walls 19 and 20 as well as upon the adjustment of switch 3 as indicated upon the scale by the pointer 18. It is preferable to connect the shaft 10 through a train of gears to the motor SM as used in commercial electric clocks, so that with the two notches as shown, the switch 3 will be closed at predetermined equal intervals of time, and the notches so formed that the switch 3 will remain closed for equal intervals of time, preferably less than the time it is open.

When the room thermostat RT opens and the temperature of the fire drops, the switch mechanism CS will respond thereto and close the switch 4. When the switch 4 closes, a circuit will be established to the motor M independently of the room thermostat RT immediately, if the switch 3 is in closed position, or as soon as it reaches closed position, and the stoker will feed fuel until the switch 3 is open or the circuit opened by the switch 4.

The interval timer IT is in continuous operation and opens and closes the switch 3 alternately for predetermined periods, but the combustion responsive mechanism CS operates intermittently for irregular and at indeterminate periods, resulting from the response of the room thermostat RT as it calls for heat and as the call is satisfied. Yet, whenever there is a sufficient drop in temperature of the fire from lack of fuel, the switch 4 closes, and through the closing of the switch 3 of the interval timer, fuel will be fed to hold the fire. If the switch 3 is in its closed interval position when the switch 4 closes, the motor will be operated during the remainder of the closed interval, unless the circuit is opened by switch 4, and if sufficient fuel is fed during that period to increase the temperature of the fire, to open the switch 4, the motor circuit is opened. If the remainder of the interval is not sufficient, the interval timer disc will open the motor circuit and, during the next closed interval of the switch 3, will feed sufficient fuel to hold the fire between succeeding intervals of stoker operation until the room thermostat calls for heat.

It is understood that the interval timer mechanism is so adjusted that the greatest amount of fuel necessary during the duration of any open interval can be supplied during any closed interval and since the combustion mechanism is directly responsive to the condition of the stoker fire it will directly reduce the amount of fuel supplied during the closed intervals in accordance with the actual condition of the fuel bed thereby acting to conserve fuel and to maintain the fire at a low rate of fuel consumption.

Figure 2:
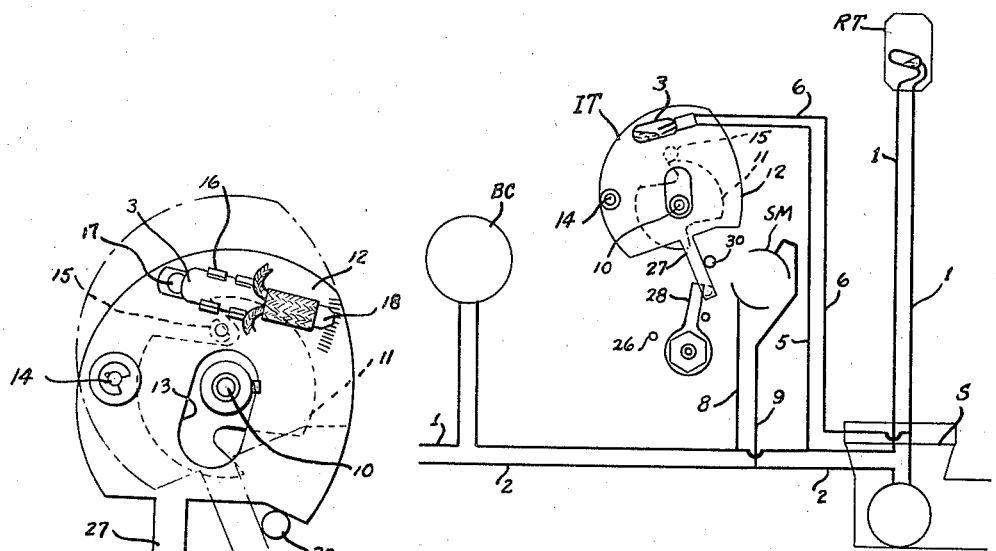
Figure 2 is a similar view of a modification of Figure 1.
Figure 7:
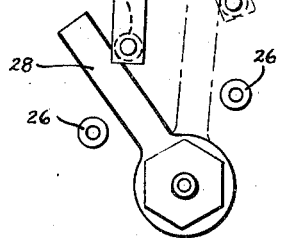
Figure 7 is an enlarged fragmentary detail view in front elevation of the combined interval timer and combustion responsive mechanism, as employed in Figure 2.

The form of this invention shown in Figures 2 and 7 combine the mechanism CS and IT to eliminate the switch 4. In this form, the interval timer mechanism IT is of the same construction as shown in Figures 1 and 3, but in this form the carrier plate 12 is provided with a depending holding arm 27 and the actuator of the combustion responsive mechanism CS omits the switch 4, but the upper projecting stop is extended between the posts 26 to form an operating arm 28 adapted to cooperate with the holding arm 27. The free end of the holding arm 27 is provided with a stud 29 adapted to extend in the path of the operating arm 28, so that as the combustion responsive mechanism responds to a decrease in temperature of the fire and rotates the arm 28, the interval timer as its closed interval position occurs, allows the switch 3 to be closed as shown in full lines in Figure 7. When the combustion responsive switch mechanism CS responds to an increase of temperature of the fire, the operating arm 28 rotates to engage the stud 29, and rotates the arm 27 to hold the carrier plate 12 in position to maintain the switch 3 in its open position, as shown in broken lines in Figure 7, and in full lines in Figure 2, so that the stud 15 will not be allowed to drop into its closed interval notch until a drop in temperature carries the operating arm 28 to release the holding arm 27. In this form, it is preferable to provide a stop 30 adapted to be engaged by the carrier plate 12 when released from the operating arm 28 to assume the closed position, as shown in full lines in Figure 7.

In this form, therefore, it is seen that the switch 4 is omitted and the wire 6, leading from the switch 3, is connected to the commercial line between the room thermostat RT and the stoker motor M, and the motor M operated independently of the room thermostat whenever the room thermostat is open, and the combustion responsive mechanism allows the interval timer to operate to close the motor circuit. It is preferable to mount the interval timer mechanism upon the same base plate 31, shown in Figure 5, as supports the combustion responsive mechanism, whereby the combined mechanisms may be mounted within the same instrument cover.

Figure 8:
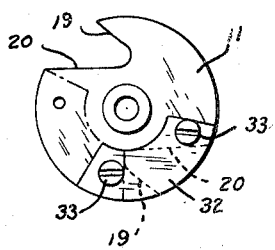
Figure 8 is a detail view in elevation of a modified from of the interval timer disc.

The notched disc 11, shown in Figures 1, 2, 3 and 7, is provided with oppositely disposed notches and may be so constructed that the switch 3 may be closed every half hour by one of the notches being brought under the stud 15. If desired to close the switch hourly, the disc 11 may be provided with a segment 32 secured to the disc so as to form a continuation of the arcuate circumference to close one of the notches, as shown in Figure 8. The disc may be provided with screw threaded apertures to receive threaded bolts 33 passing through the segment 32 to secure it in place. Also, a third similarly screw threaded aperture may be provided in the disc 11 so that the segment 32 may be carried on the disc when not used to cover the notch, as shown in broken lines in Figure 8.

In controlling the operation of a stoker during the "off" thermostat periods, almost without exception, two operations of feeding an hour is adequate to maintain a fire.

The matters of concern which arise, however, deal with the length of the period during which hold fire operations may occur and the number of operations during those periods it is deemed desirable.

As the combustion device employed in this invention operates not at fixed temperatures, but upon temperature changes all along the range of temperature produced by the fire, it can be seen readily, that if such a device is made very sensitive to temperature changes so as to conserve fuel as in some types of applications where a high rate of feed exists or a slow burning fuel is used, when a good bed of fire is established, as after a thermostat run, any operation of the stoker during a period of one or two hours thereafter would produce a sufficient temperature increase to operate the combustion device in a very short time, and as the temperature will fall rapidly each time the stoker stops, a series of hold fire operations may occur, while the timer switch closing period is in effect, due to the frequent operation of the combustion responsive mechanism.

While these several operations during the "on" period of the timer switch would not be of long enough periods to build the fire to cause a condition of house overheating, they, nevertheless, may be undesirable from the standpoint of unnecessary operations or the cause of concern to the householder to whom the intermittent operation may not be understood and viewed with alarm or considered disturbing, particularly at night, if the starting of the stoker mechanism is very audible. From this standpoint, it would be desirable to limit the hold fire operation to once during the closed timer switch period.

With the fire bed in such condition as to ignite fresh fuel readily and cause a quick operation of the combustion device, it follows that the period during which the interval timer switch is closed need not be long, so as to reduce the number of operations. On the other hand, should there be no thermostat call for a long period, the fire may gradually burn down until but a crested bed of dull red coals exists so that a hold fire operation of a longer duration is needed.

Therefore, it follows that when the combustion device is opened, further hold fire operations are desired stopped until the start of another interval timer switch closing cycle. This will eliminate frequent operations when the fire is good, caused by rapid temperature changes operating the combustion device during the closed timer period. It also follows that it should be possible for the interval timer switch to be closed during a period of sufficient length that will supply sufficient fuel to maintain the fire at its lowest state.

Figure 9:
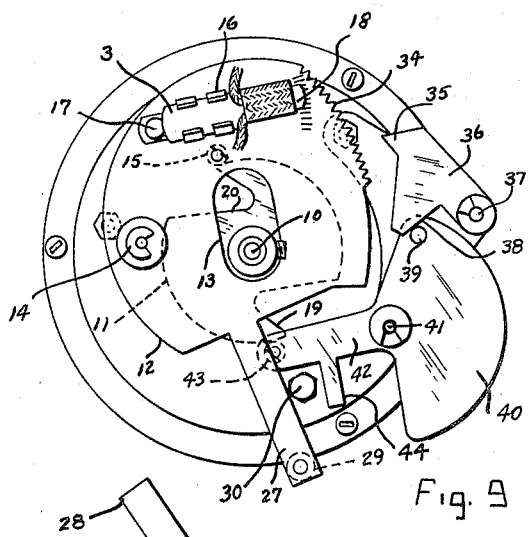
Figure 9 is a view similar to Figure 7 of a further modification, showing the switch opened by the interval timer disc.
Figure 10:
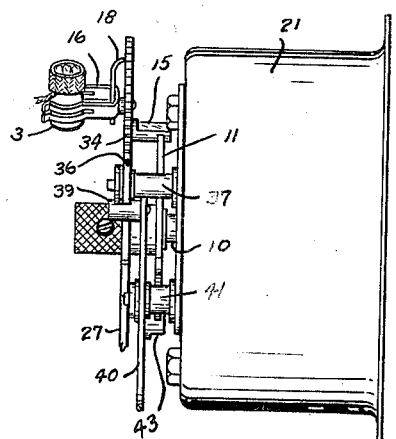
Figure 10 is a view similar to Figure 4 applied to said further modification.
Figure 11:
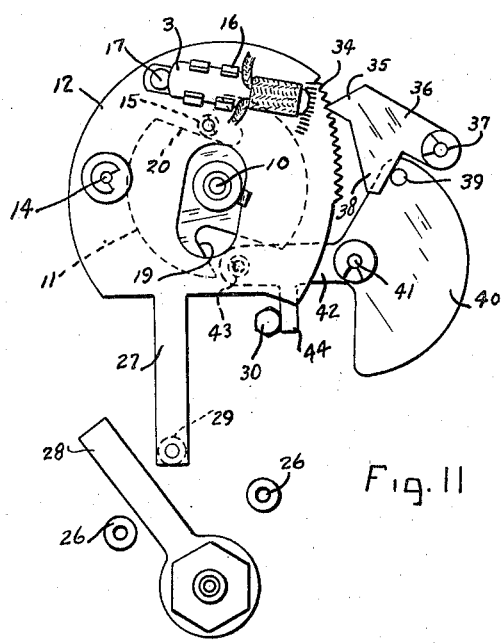
Figure 11 is a view similar to Figure 9 showing the closed switch as it is being opened by the interval timer disc.
Figure 12:
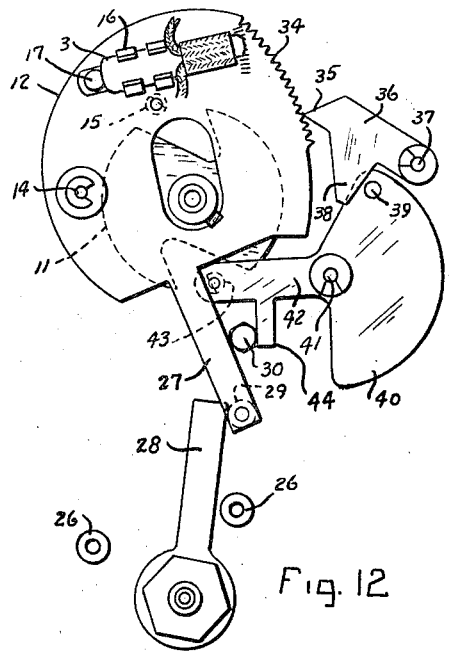
Figure 12 is a view similar to Figure 11 showing the switch carrier plate in latched position to hold the switch open.

This invention contemplates a means to overcome the above objections as illustrated in Figures 9 to 11, inclusive. This embodiment of this invention is shown as applied to the form illustrated in Figures 2 and 7 in which the switch 4 is omitted and the combustion responsive mechanism CS cooperates with the interval timer IT mechanism in the same manner as disclosed in Figure 7 and includes additional mechanism which acts to hold the switch 3 in the open position in case the combustion responsive mechanism responds to a drop in temperature just after having interrupted an operation caused by the switch 3, and until the interval timer disc has rotated to a position in which the disc itself could maintain the switch 3 open.

In the form shown in Figure 9 to 12, a portion of the carrier plate 12 opposite its pivot post 14 is provided with a toothed segment 34 adapted to be engaged by the pointed free end 35 of a latch 36 pivoted at its other end upon a post 37 carried upon the cover 21 so that the latch normally engages between two teeth of the segment 34 and prevents clock-wise rotation of the carrier plate 12 to close the switch, but allows the end 35 of the latch to travel over the teeth of the segment 34 upon counterclock-wise movement of the plate 12. The latch 36 is provided with an operating arm 38 depending from its under side intermediate its ends adapted to coact with an actuator stud 39 carried upon an actuator plate 40 mounted for rotation upon a post 41 also carried on the cover 21. The actuator plate 40 is provided with an operating arm 42 extending therefrom to overlap the interval timer disc 11 with the free end provided with a stud 43 similar to stud 15 which, like stud 15, is adapted to travel over the periphery of the disc 11 as the disc rotates. The relation of the arm 42 to the remainder of the plate 40 and position of the actuator stud 39 is such that as the stud 43 travels over the arcuate portions of the disc 11 between the notches, the actuator plate will be so positioned that the actuator stud 39 will engage the operating arm 38 of the latch and hold its pointed end 35 out of engagement with the toothed segment 34. As a notch of the disc 11 is brought under the stud 43, the weight of the actuator plate 40 on the side opposite its pivot will cause the stud 43 to drop into the notch and in so doing will cause the actuator stud 39 to move out of the path of the operating arm 38 and allow the latch pivot 35 to engage between the teeth of the segment 34. The stud 43 is so positioned upon the arm 42 that it will travel upon the arcuate portion of the disc 11 a sufficient distance after the stud 15 has dropped into the opposite notch to allow the carrier plate 12 to swing and close the switch 3 before the latch 36 is released to engage the segment 34. The operating arm 42 is provided with a depending stop 44 adapted as the stud 43 enters a notch to engage the stop 30 so as to limit the rotation of the actuator plate 40 with the actuator stud 39 out of engagement with the latch 36.

In the event the switch 3 has been opened by the normal operation of the disc 11, as shown in Figure 9, the latch 36 will be out of engagement with the toothed segment 34 and the stud 15 is traveling over the arcuate portion of the disc 11, then and only then if the operating arm 28 of the combustion responsive mechanism CS is in position to release the switch carrier plate 12 will the stud 15 drop into the notch as it passes under it to close switch 3 because the actuator plate 40 will be held in position with the actuator stud 39 holding the latch 36 free of the segment 34 by stud 43 being in engagement with the arcuate portion of the plate 11, as hereinbefore described, until the stud 15 drops into the notch. As the switch 3 is closed and the stud 43 travels over the opposite notch, the latch is free to engage the segment 34, as shown in Figure 11, but as the carrier plate 12, through stud 15 riding upon the side 20 of the notch, is rotated in a counter-clockwise direction, the segment 34 rides under the end 35 of the latch and the switch 3 is opened by the normal operation of the interval timer mechanism.

While in the normal open position of switch 3 with the operating arm 28 in engagement with the carrier plate stud 29 resulting from a rise in temperature operating the combustion responsive mechanism CS, the interval timer disc 11 continues to rotate causing the latch 36 to be lifted to free the carrier plate 12 as the stud 43 travels over the arcuate portion thereof and each time a notch has passed under stud 15 which is prevented from dropping thereinto by operating arm 28, the stud 43 drops into the opposite notch and allows the latch 36 to engage the segment 34, as shown in Figure 12, until again freed by stud 43 traveling over an arcuate portion. Therefore, it is readily seen that in the event a temperature drop occurs while the stud 43 is traveling over a notch in the timer disc 11, the switch 3 is locked in its open position until the next normal operation, as described in connection with Figure 9.

In this form as well as in the other forms shown and described, whenever the switch 3 has normally closed by the stud 15 dropping into a notch in the interval timer disc 11, the switch 3 may be opened by a temperature increase before the stud 15 has completed its travel over the periphery of the notch to open the switch normally.

What I claim is:

1. An interval timing mechanism in the control circuit of an electrically operated and controlled stoker mechanism co-acting with a combustion responsive mechanism for feeding fuel independently of other controls including a timer switch in an independent circuit to the stoker motor, a pivoted carrier plate mounting said switch, a continuously rotating timer disc, means upon the carrier plate coacting with means upon the timer disc to open and close the switch continuously and successively for periodic intervals of time, and means upon the carrier plate adapted to coact with the combustion responsive mechanism to open the timer switch upon a rise in temperature of the products of combustion and maintain it open independent of the timer disc until a drop in said temperature occurs and then to permit the switch to be closed by the timer disc at its succeeding closed interval, said carrier plate provided with a toothed segment adapted to be engaged by a pivoted latch to maintain the switch in open position and means coacting with the timer disc to free the carrier plate to close the switch if a drop in the temperature of the products of combustion has occurred and is maintained during the preceding open interval of the timer disc.

2. An interval timing mechanism in the control circuit of an electrically operated and controlled stoker mechanism coacting with a combustion responsive mechanism for feeding fuel independently of other controls including a timer switch in an independent circuit to the stoker motor, a pivoted carrier plate mounting said switch, a continuously rotating timer disc, means upon the carrier plate coacting with means upon the timer disc to open and close the switch continuously and successively for periodic intervals of time, and means upon the carrier plate adapted to coact with the combustion responsive mechanism to open the timer switch upon a rise in temperature of the products of combustion and maintain it open independent of the timer disc until a drop in said temperature occurs and then to permit the switch to be closed by the timer disc at its succeeding closed interval, said carrier plate provided with a toothed segment adapted to be engaged by a pivoted latch to maintain the switch in open position and means coacting with the timer disc to free the carrier plate to close the switch if a drop in the temperature of the products of combustion has occurred and is maintained during the preceding open interval of the timer disc, and means rendering said last means inoperative if the said drop in said temperature occurs after the timer disc has entered and passed beyond the initiation of its closed interval.

3. A control device for controlling the operation of a stoker during periods when the temperature requirements of a space to be heated are satisfied consisting of a time device for intermittently operating the stoker at timed intervals and a differential temperature device responsive to changes in temperature of the products of combustion to limit the operation of the stoker by said timer to periods when said temperature is declining or has declined to a static state, the duration of said periods being determined by a change in said temperature sufficient to operate said differential device regardless of the temperature existing at the time the change is initiated, and means cooperatively associated with the time and temperature devices to allow but one stoker operation in each time controlled period for any number of temperature device operations in the same period.

4. In a control for an electrically operated and controlled coal stoker mechanism, a room thermostat for controlling the normal operation of the stoker motor in combination with two coacting mechanisms, one a timing mechanism continuously opening and closing a switch in a circuit connected to the motor independently of the room thermostat during periodic intervals of time, and the other responsive to combustion conditions to prevent the interval timer circuit from operating the motor during a period of increasing temperatures of the products of combustion, and during a period of decreasing temperatures thereof to permit the interval timer circuit to operate the motor during the closed interval of the timing mechanism to maintain combustion during the intervals of time the room thermostat opens its circuit to the stoker motor, and wherein the interval timing mechanism includes means preventing a closing of the switch by the combustion mechanism responding to a drop in the temperature of the products of combustion occurring after the initiation of said closed interval by the timing mechanism.

5. In a control for an electrically operated and controlled coal stoker mechanism, a room thermostat for controlling the normal operation of the stoker motor in combination with two co-acting mechanisms, one a timing mechanism continuously opening and closing a switch in a circuit connected to the motor independently of the room thermostat during periodic intervals of time, and the other responsive to combustion conditions to prevent the interval timer circuit from operating the motor during a period of increasing temperatures of the products of combustion, and during a period of decreasing temperatures thereof to permit the interval timer circuit to operate the motor during the closed interval of the timing mechanism to maintain combustion during the intervals of time the room thermostat opens its circuit to the stoker motor, wherein the combustion responsive mechanism includes means to open the timer switch circuit during its normally closed interval in response to a rise in temperature of the products of combustion, and wherein the interval timing mechanism includes means to prevent a closing of the switch by the combustion mechanism responding to a drop in the temperature of the products of combustion occurring after the initiation of said closed interval by the timing mechanism.

IRA E. McCABE.